United States Patent [19]

Eriksen et al.

[11] Patent Number: 5,451,153

[45] Date of Patent: Sep. 19, 1995

[54] SEALING ARRANGEMENT FOR OPTODEVICE MOULDS

[75] Inventors: Paul Eriksen, Tyresö; Jan-Ake Engstrand, TrAngsund; Hans-Christer Moll, Enskede, all of Sweden

[73] Assignee: Telefonaktiebolaget LM Ericsson, Stockholm, Sweden

[21] Appl. No.: 249,992

[22] Filed: May 27, 1994

[30] Foreign Application Priority Data

Jun. 1, 1993 [SE] Sweden .................................. 9301859

[51] Int. Cl.⁶ ........................ B29C 45/14; B29D 11/00
[52] U.S. Cl. ........................................ 425/116; 249/91; 249/97; 264/1.24; 425/542; 425/DIG. 47
[58] Field of Search ............... 425/116, 577, DIG. 47, 425/542; 249/91, 93, 94, 95, 96, 97; 264/1.24, 1.25, 1.28

[56] References Cited

U.S. PATENT DOCUMENTS

| 4,092,396 | 5/1978 | McCartney et al. | 264/1.25 |
| 4,107,242 | 8/1978 | Runge | 264/1.25 |
| 4,173,389 | 11/1979 | Curtis | 264/1.25 |
| 4,689,005 | 8/1987 | Plummer | 264/1.25 |
| 4,711,752 | 12/1987 | Deacon et al. | 264/1.25 |

FOREIGN PATENT DOCUMENTS 0048597 3/1982 European Pat. Off. .

*Primary Examiner*—Khanh P. Nguyen
*Attorney, Agent, or Firm*—Burns, Doane, Swecker & Mathis

[57] ABSTRACT

A mold arrangement for moulding an optodevice onto an optical ribbon fibre. The mould includes of a plurality of plates which are intended to be inserted between the movable top plate and the stationary bottom plate, or counterpressure plate, of a transfer moulding press, and includes an inlet channel, primary and secondary runners and an optodevice moulding cavity formed when two plates are brought together and through which the ribbon fibre extends. According to the invention, the mould cavity is provided with an outwardly projecting part at the ribbon-inlet end of the optodevice, and a seal in the form of a rubber sleeve or a sleeve of some similar material disposed around the ribbon and positioned in the mould cavity so that one end of the sleeve will completely fill the outwardly projecting part and so that the other end of the sleeve extends into the mould cavity. The seal in the moulded optodevice extends out from the optodevice around the ribbon fibre.

2 Claims, 1 Drawing Sheet ns, and
an optodevice moulding cavity defined by two of said plates, the fibre ribbon extending through said cavity.

SEALING ARRANGEMENT FOR OPTODEVICE MOULDS

BACKGROUND

The present invention relates to a mould arrangement for moulding optodevices onto optical fibre ribbons, wherein the mould comprises a plurality of plates which are intended to be inserted between the movable top plate, or press plate, and the stationary bottom plate, or counterpressure plate, of a transfer moulding press, and includes an inlet channel, primary and secondary runners, and an optodevice moulding cavity defined by two of said plates, the fibre ribbon extending through said cavity.

It is known to mould optodevices or ferrules directly onto optical fibres by means of a so-called transfer moulding process. This process involves ejecting moulding compound, such as thermoplastic or like material, into the mould cavity under high pressure, meaning that the seal between the fibre and the mould tool is critical. Although this is not normally a problem in the case of single optofibres having accurate tolerances, the problem of obtaining an effective seal for fibre ribbons is made difficult by the larger tolerances. For instance, when the tolerance for the fibre ribbon lies on a minimum measurement, the seal between ribbon and mould tool becomes incomplete and moulding compound will consequently spray out of the tool. On the other hand, if the tolerance for the fibre ribbon lies on a maximum value, there is a risk that the fibres will be crushed in the tool and reduced to scrap.

SUMMARY

The object of the present invention is to avoid the problem encountered with different ribbon tolerances, by providing a mould which is adapted to provide an effective seal in the case of both minimum and maximum ribbon tolerances, without risk of the fibres being squashed to pieces. This object has been achieved by constructing the mould so that a seal in the form of a rubber sleeve which embraces the ribbon cable can be moulded into the optodevice.

An inventive sealing sleeve affords the advantage of taking-up those tolerance deviations that can occur in the ribbon and in preventing moulding compound from spraying from the moulding tool at minimum tolerances and in preventing the fibre from being crushed in the tool at maximum tolerances.

A further advantage obtained with the sealing sleeve is that the sleeve functions as a heat shield for the optofibre present in the tool during the moulding process, and that the sleeve in the moulded optodevice also functions as a break guard between device and ribbon.

The invention will now be described in more detail with reference to a preferred exemplifying embodiment thereof and also with reference to the accompanying drawing.

DETAILED DESCRIPTION

Figure 1:
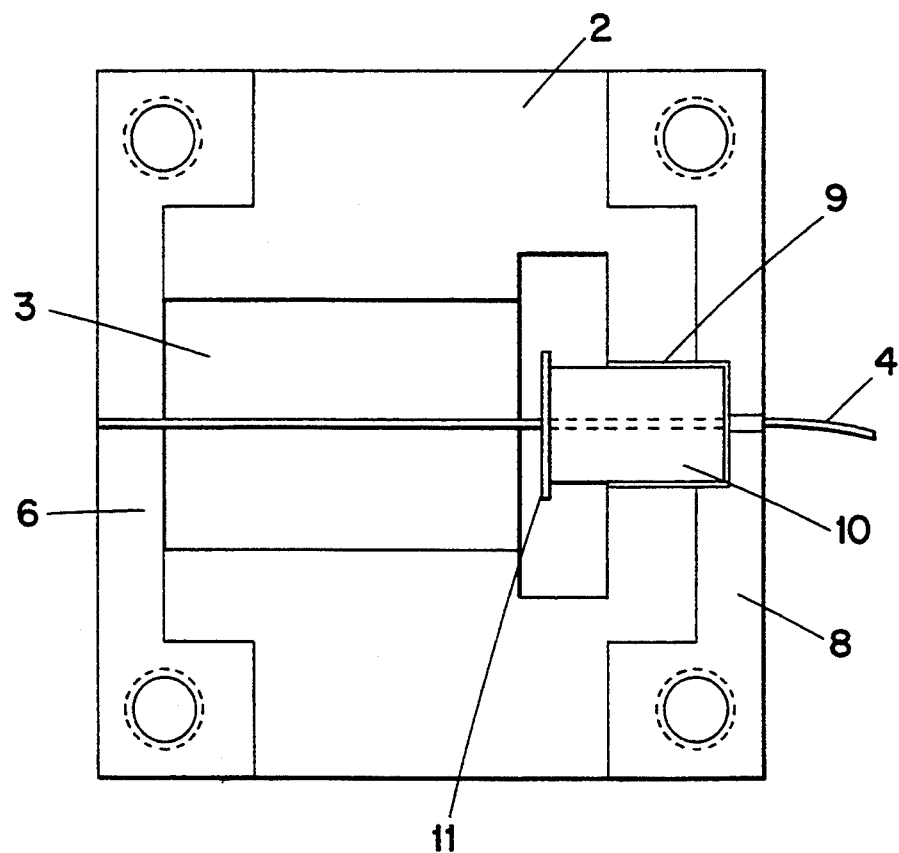
FIG. 1 is a schematic view of an inventive mould from above, and shows a seal in the form of a rubber sleeve.

The drawing illustrates schematically a mould for moulding an optodevice onto an optical fibre ribbon. Solely those elements significant to the invention have been included in the drawing. For instance, those parts of the mould which include necessary inlet channels, primary and secondary runners, etc., have not been shown. Furthermore, only one mould cavity has been shown, although in practice the mould will advantageously include a plurality of mould cavities so that a plurality of optodevices can be moulded simultaneously onto a corresponding number of fibre ribbons.

Figure 2:
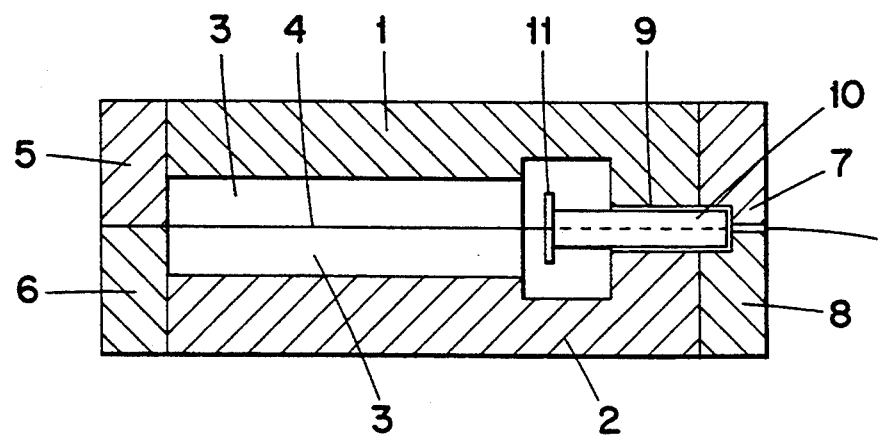
FIG. 2 is a sectional view taken from one side of the mould and the seal illustrated in FIG. 1.

The mould is preferably a modified plate mould comprised of a plurality of plates, of which the two plates which together define the optodevice mould cavity are illustrated in FIGS. 1 and 2. The two plates of the illustrated embodiment are mutually identical and comprise a top plate 1 and a bottom plate 2, each having a mould cavity 3 formed therein. The plates 1 and 2 are provided with exchangeable front jaws 5 and 6 and exchangeable back jaws 7 and 8 which function to hold a fibre ribbon or cable 4 centrally in position, through the combined cavities 3 during a moulding process. The jaws 5, 6 and 7, 8 are exchangeable so as to enable the mould to be adapted to different fibre ribbons 4 comprising, for instance, four, eight or twelve fibres. The front jaws 5 and 6 are constructed to take-up and hold the optical fibres from which protective sheathing material has been removed for moulding purposes, whereas the back jaws 7 and 8 are correspondingly constructed to take-up the ribbon 4 coated with a protective layer.

In accordance with the invention, the cavity 3 in each plate 1 and 2 is provided with an outwardly projecting part 9 in which a seal in the form of a rubber sleeve 10 or a sleeve made of similar material is arranged. The sleeve 10 is disposed around the cable or fibre 4 and holds the fibre firmly in the mould and is configured so that one end will completely fill the combined, outwardly projecting part 9 and seal this part so as to prevent moulding compound from being sprayed from the tool during the moulding operation as a result of those variations that can occur in the size of the ribbon or cable 4. The other end of the sleeve 10 projects into the cavities 3 and is provided with a flange 11 which anchors the sleeve 10 securely in the moulded optodevice. The sleeve 10 also functions as a heat shield for the fibre or cable in the mould tool during a moulding operation, and functions in the finished, moulded device as a break guard between cable and device.

It will be understood that the mould and the seal described above and illustrated in the drawing are solely given by way of example and that the mould and seal can be varied and modified in many different ways.

It will also be understood that the invention is not restricted to the described and illustrated embodiment and that modifications can be made within the scope of the following Claims.

We claim:

1. A mold for molding optodevices onto optical fiber ribbons or cables comprising:

a plurality of plates which are intended to be inserted between a movable top plate and a stationary bottom plate of a transfer molding press;

an inlet channel;

primary and secondary runners; and an optodevice mold cavity defined by two of the plurality of plates and through which the fiber ribbon or cable extends;

wherein the mold cavity has an outwardly projecting part disposed at a ribbon-inlet end of the optodevice; and a sealing sleeve is disposed around the fiber ribbon or cable and is mounted in the mold cavity so that one end of the sleeve completely fills the projecting part and so that the other end of the sleeve extends into the mold cavity, whereby the sealing sleeve in a molded optodevice extends out from the molded optodevice around the fiber ribbon or cable.

2. The mold of claim 1, wherein the sealing sleeve includes a flange that is disposed such that the flange is located within the molded optodevice.

* * * * *